United States Patent

[11] 3,573,843

| [72] | Inventor | Bill W. Solley |
| | | Columbus, Ohio |
| [21] | Appl. No. | 706,103 |
| [22] | Filed | Feb. 16, 1968 |
| [45] | Patented | Apr. 6, 1971 |
| [73] | Assignee | Industrial Nucleonics Corporation |

[54] DATA AND TIME RECORDER
11 Claims, 3 Drawing Figs.

[52] U.S. Cl. ..................................................... 346/34, 346/62, 346/113
[51] Int. Cl. ..................................................... G01d 9/34
[50] Field of Search ..................................... 346/34, 62, 115, 30, 20, 113; 340/183

[56] References Cited
UNITED STATES PATENTS

| 1,073,555 | 9/1913 | Aberegg | 346/115 |
| 2,849,704 | 8/1958 | Neff | 340/183X |
| 2,967,749 | 1/1961 | Strickler | 346/33 |
| 3,091,756 | 5/1963 | Lowman | 346/34X |
| 3,125,400 | 3/1964 | Moyano | 346/34 |
| 3,255,458 | 6/1966 | Mellon | 346/34X |
| 3,300,785 | 1/1967 | Richardson et al. | 346/34X |

*Primary Examiner*—Joseph W. Hartary
*Attorneys*—Lowe and King, William T. Fryer, III, C. Henry Peterson and James J. O'Reilly

ABSTRACT: Disclosed is a strip chart recorder having a pen driven by amounts proportional to measured data and analogue time indicating signals on a time division multiplex basis. The chart is advanced as each signal is fed to the pen. The time indicating signals are fed to the pen at will or periodically. In the latter case, the time-indicating signals are generated when a gauge deriving the measured data is being standardized.

INVENTOR,
BILL W. SOLLEY

BY Lowe & King
ATTORNEYS

Patented April 6, 1971

INVENTOR,
BILL W. SOLLEY

BY
Lowe & King
ATTORNEYS

DATA AND TIME RECORDER

The present invention relates generally to recorders and more particularly to a recorder wherein a pen is deflected by an amount commensurate with data and time indications.

It is long recognized desideratum of strip chart recorders to provide an indication of the times at which data are recorded. In the past, one typical system has involved the use of a digital display comprising a clock for actuating numerical print wheels that print the time data.

It has been found, however, that the print wheel structure is unreliable in that the numeral wheels are often not properly brought into contact with the recorder chart or not driven correctly by the clock motor. In addition, the housing of the digital time display occupies a significant portion of the exposed face of the strip chart recorder, whereby an appreciable segment of the data recorded may not be viewed and analyzed as it is derived, or shortly thereafter.

According to another technique described in the literature, but not available commercially to my knowledge, time indications are provided on a strip chart recorder by providing one pen for the data being recorded and another pen for writing time indications as deflections across the width of the chart. Such a system, however, appears to be excessively expensive to be feasible for use in a commercial device to record the ancillary time function if it is realized that the addition of a single pen to a typical chart recorder may involve an expense on the order of several thousand dollars.

According to the present invention, time and data indications are provided on a strip chart recorder by multiplexing the recorder pen between a data source and a voltage indicative of time. The pen is activated either periodically or at will to be responsive to the time-indicating voltage. Thereby, the pen is deflected by an amount indicative of time while being multiplexed with a value proportional to the data being measured, so that a reasonably inexpensive chart recorder may be utilized and the problems attendant with digital marking of time on a recorder chart are obviated.

According to another feature of the invention, the chart is advanced each time a time indication is fed thereto, regardless of the operating condition of the system being measured. Thereby, the chart provides a running time indication that is easily discerned because each individual time indication is at a different point along the length of the chart.

According to another aspect of the invention, the timing indication is marked on the recording strip chart in response to the measuring equipment comprising the data source being standardized. Because the periodic timing deflections are applied to the chart recorder in response to the measuring equipment being standardized, all data from the measuring circuit are coupled to the recording chart.

It is accordingly, an object of the present invention to provide a new and improved chart recorder having provision for indicating time data.

Another object of the present invention is to provide a chart recorder wherein data and time indications are recorded with a single pen.

Another object of the present invention is to provide a chart recorder having a single marking pen time division multiplexed between timing and data sources, wherein all data from a measuring network are coupled to the recorder because timing indications are recorded in response to standardization of the measuring equipment.

A further object of the present invention is to provide a new and improved system for displaying time and measurement indications with the deflection of a recording pen, wherein the pen can be deflected to the time indication either periodically or at will.

An additional object of the present invention is to provide a strip chart recorder wherein a pen is deflected by an amount proportional to time and the chart is advanced each time that a time indication is recorded.

An additional object of the present invention is to provide a new and improved strip chart recorder providing time indications, which recorder is less expensive, more reliable and easier to maintain than prior art recorders.

The above and still further objects, features and advantages of the present invention will become apparent upon consideration of the following detailed description of several specific embodiments thereof, especially when taken in conjunction with the accompanying drawings, wherein.

While the present invention is to be disclosed specifically in conjunction with measuring the basis weight of paper during manufacture, as monitored by a penetrating radiation gauge, it is to be understood that the teachings of the invention are applicable to providing data and time indications for other types of processes and signals.

Figure 1:
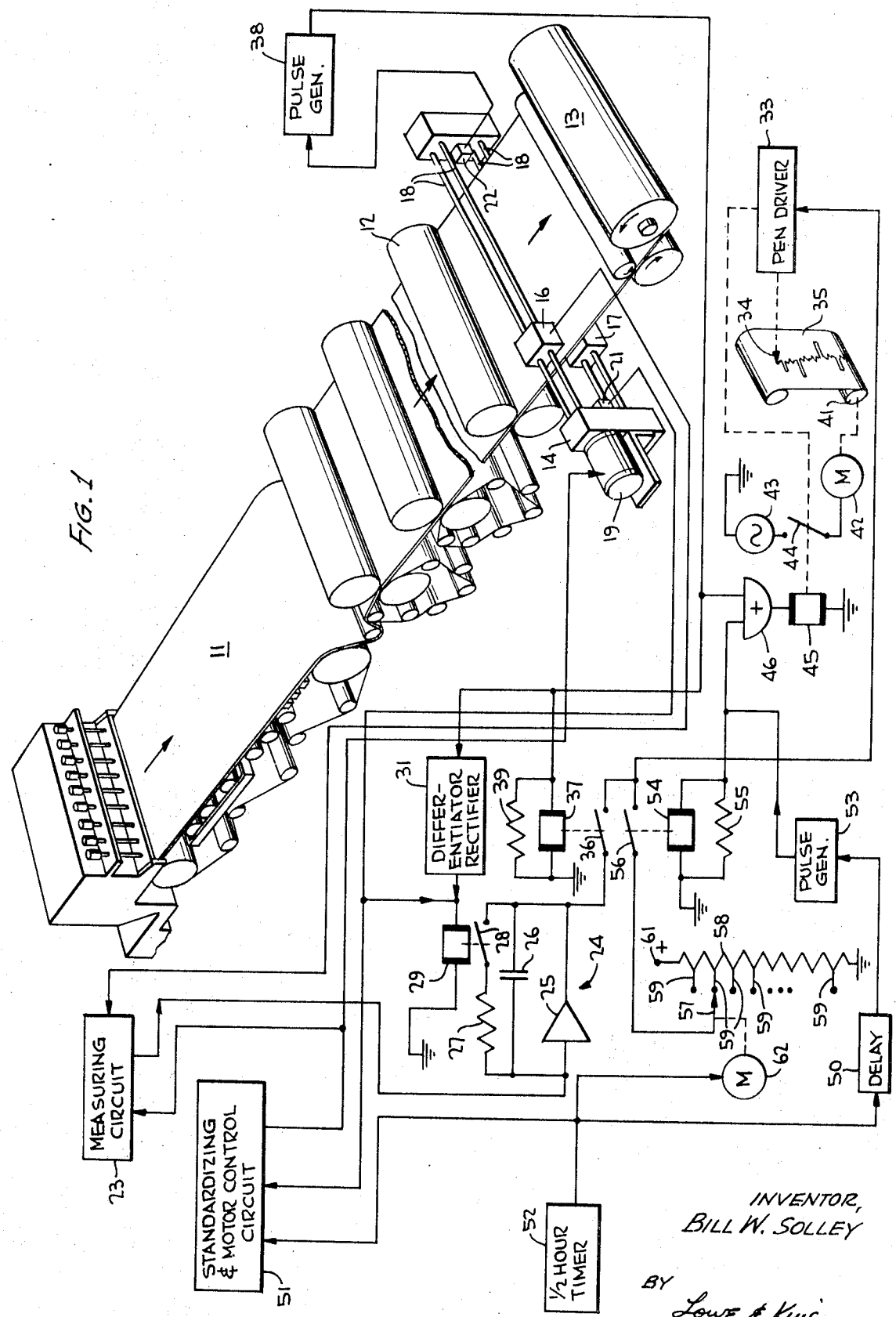
FIG. 1 is a schematic diagram illustrating an embodiment of the invention wherein a recorder chart is periodically activated to display time indications.

Reference is now made to FIG. 1 of the drawings wherein there is illustrated a system for recording the average basis weight of paper sheet 11 during formation. Sheet 11 is illustrated as passing between calender rollers 12 and takeup roll 13 Positioned between calender rollers 12 and takeup roll 13 is a scanning gauge mount 14 which carries traversing guide tubes 18 that in turn support on opposite sides of sheet 11 nuclear radiation gauge detector head 16 and radiation source 17. Detector 16 and source 17 are together scanned across the width of paper sheet 11, from one edge thereof to the other, in response to rotation of motor 19, having a shaft coupled to the detector and source via guide tubes 18. Provided at the edges of the sheet 11 are microswitches 21 and 22 which generate finite, positive voltages in response to the source and detector reaching off-sheet positions.

To provide an indication of the basis weight of sheet 11 as gauge 16 scans across the sheet width, the gauge output is connected to measuring circuit 23, which can take several forms. The circuits shown in U.S. Pat. application Ser. No. 589,021, filed Oct. 24, 1966, assigned to the assignee of the present application, or in U.S. Pat. application Ser. No. 622,346, filed Mar. 10, 1967, also commonly assigned, can be adapted to serve the function of measuring circuit 23. Measuring circuit 23 is adapted to provide DC analogue output voltage proportional to the basis weight of sheet 11 for each region of sheet 11 irradiated by a window defined by detector 16 and source 17.

To provide a measure of the average basis weight of sheet 11 for each scan of detector 16 and source 17 across sheet 11, analogue computer integrator 24 is connected to the output of measuring circuit 23. Integrator 24 includes a DC operational amplifier 25, having feedback capacitor 26, the accumulated voltage of which is selectively discharged by the series combination of resistor 27 and normally open relay contacts 28. Contacts 28 are closed in response to detector 16 and source 17 reaching either edge of sheet 11. When detector 16 and source 17 reach the edge of the sheet proximate microswitch 21, the microswitch output voltage energizes relay winding 29 immediately. In contrast, relay 29 is energized 10 seconds after detector 16 and source 17 reach the edge of sheet 11 proximate switch 22. To this end, the voltage generated by microswitch 22 is coupled to actuate 10-second pulse source 38. The output of source 38 is coupled to differentiator rectifier network 31, which generates a short duration pulse in response to the trailing edge of the pulse generated by source 38. The pulse actuates relay 29 to close contact 28 for a sufficient time interval to enable the voltage of capacitor 26 to be discharged. Thereby, integrator 24 derives a DC analogue signal voltage commensurate with the average basis weight for each scan of detector 16 and source 17 across sheet 11 toward microswitch 22 for a 10-second period after the scan has been completed.

The DC output voltage of integrator 24 at the end of each scan toward microswitch 22 is fed to driver 33 for translating pen or scriber 34 of recorder 35 in response to relay contacts 36 being closed. Contacts 36 are closed in response to activation of relay winding 37, that is energized by the pulses generated by source 38 in response to activation of microswitch 22.

The strip chart of recorder 35 is advanced for approximately 10 seconds each time the output voltage of integrator 24 is being applied to pen driver 33; the advance being in response to takeup roller 41 of recorder 35 being driven by the output shaft of synchronous motor 42. Synchronous motor 42 is selectively driven by AC source 43 through a circuit established by closing normally open contacts 44. Contacts 44 are closed in response to activation of relay winding 45, which in turn is energized for 10 seconds each time a pulse is generated by source 38 and coupled to the winding via OR gate 46. After the 10-second pulse from source 38 has terminated, relay winding 45 is deenergized, opening contact 44 to stop translation of the strip chart included in recorder 35. Pen 34 normally remains in situ at the position determined by the output voltage of integrator 24 coupled to driver 33 while contacts 36 were closed until the next scan of detector 16 and source 17 has been completed, at which time the pen is again deflected by an amount indicative of the average basis weight across the width of sheet 11. Hence, pen 34 and the chart of recorder 35 are both generally moved at the same time or remain in situ.

To enable pen 34 to be driven selectively to a position commensurate with the input voltage to driver 33 and at other times maintain the pen in situ while no voltage is applied to the driver, the driver preferably comprises a motor and control circuit of the type described and illustrated in U.S. Pat. No. 3,007,052, issued to Hickman. Specifically, such a driver includes a motor and bridge balancing network for translating pen 34 to a position indicative of the input voltage to driver 33. In addition, the driver includes switch contacts for selectively removing power from the armature of the motor translating pen 34, which contacts are energized to apply power to the armature in response to energization of relay winding 45.

An integral part of basis weight measuring systems employing penetrating nuclear radiation is timer 52, as well as standardizing and motor control circuit 51, which is preferably of the type disclosed in U.S. Pat. No. 2,829,268, issued to Chope. Timer 52 periodically, on the order of once every half hour, generates a signal to activate standardizing and motor-control circuit. Standardizing and motor-control circuit 51 responds to the output signal of timer 52 to initiate automatically a series of steps whereby motor 19 drives detector 16 and source 17 to an off-sheet position at the same side of sheet 11 as microswitch 21. After detector 16 and source 17 reach the off-sheet position, microswitch 21 feeds a signal to standardizing and motor control circuit 51, whereby measuring circuit 23 is standardized or adjusted to provide a predetermined output for the relatively stable condition of only air between detector 16 and source 17.

According to the embodiment of FIG. 1 of the present invention, in response to measuring circuit 23 being standardized and while no data signals are being supplied by integrator 24 to recorder 35, the chart is advanced and an indication of the time at which the standardization operation is being performed is provided by deflecting pen 34 by an amount commensurate with time. To this end, the output signal of timer 52 that actuates standardizing and motor control circuit 51 is also applied to pulse generator 53 through 15-second delay network 50. Pulse generator 53 responds to the delayed output of timer 52 to derive a positive voltage for a 10 second period while the standardizing operation is still taking place. The 10-second pulse generated by source 53 is coupled in parallel to windings 45 and 54, the former connection being via OR gate 46. Thereby, the strip chart of recorder 35 and pen 34 begin moving substantially simultaneously, and, at the same time, a voltage indicative of time of day is fed through contacts 56 to driver 33.

The time of day indicating signal fed to pen driver 33 via contact 56 is a DC analogue signal voltage derived from slider 57 of circular potentiometer 58, having 48 separate taps 59 equally spaced about the potentiometer slide wire and energized with a DC voltage source connected between terminal 61 and ground. Slider 57 of potentiometer 58 is driven between adjacent taps 59 in response to each activation of 48 position stepping motor 62, having a rotor advanced by 1/48 of a revolution in response to each output signal of timer 52.

By adjusting the position of slider 57 so that it engages the highest potential tap 59 of potentiometer 58 at midnight and arranging timer 52 so that it derives an output at the same time, maximum and minimum output voltages are respectively provided on slider 57 immediately after midnight and 11:30 P.M. Thereby, pen 34 is deflected by a maximum amount, to the extreme left-hand side of the strip chart illustrated, at the beginning of each day. For every succeeding half hour during the day, slider 57 is driven about potentiometer 58 to engage the tap 59 having the next highest potential. Therefore, at 12:30 A.M., pen 34 is driven to a position slightly to the right of the position of the pen at 12 midnight. As the day progresses further, slider 57 is driven past succeeding taps 59 on potentiometer 58 and finally at 11:30 P.M. reaches the lowest potential tap at a voltage slightly above ground. With slider 57 engaging the lowest potential tap on potentiometer 58, pen 34 is deflected only slightly, to a position proximate the right-hand side of the chart of recorder 35. Because of the circular nature of potentiometer 58, the next movement of slider 57 results in the highest potential tap 59 being engaged at 12 midnight of the next day and pen 34 is again deflected to the extreme left-hand side of the chart.

An important feature of the invention to enable accurate indications of time and other data to be derived involves deflecting pen 34 for a relatively long period of time, for example 10 seconds. If pen 34 were pulsed rather than activated with a relatively long duration voltage, the inertia of driver 33 and pen 34 would very likely result in the pen not being deflected by an amount properly proportional to the amplitude of the DC signal applied to the pen driver 33.

Figure 2:
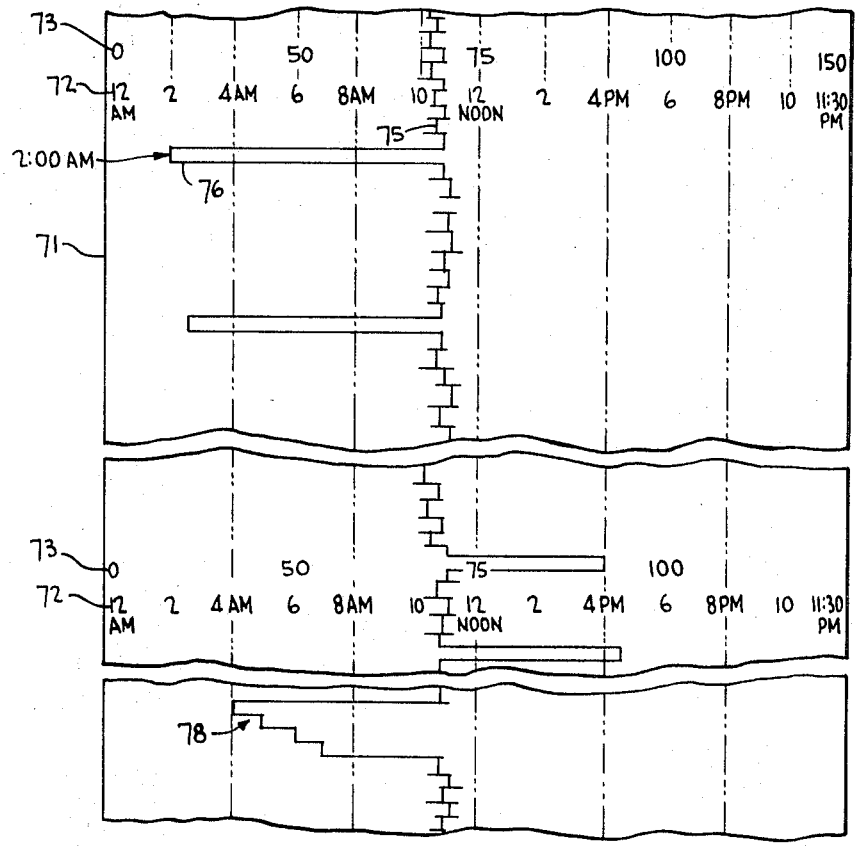
FIG. 2 is an illustration of a typical chart drawn with the recorder of FIG. 1.

To provide a better understanding of the invention and the chart it derives, reference is made to the chart and trace derived by the recorder of the invention, as illustrated by FIG. 2. Chart 71 of FIG. 2 has superinscribed thereon across its width, at a plurality of longitudinal positions along the chart, left to right indications 72 and 73 of time and basis weight. The time indications 72 are preferably marked with ink having a different color from the basis weight indication 73. As seen from time indications 72, the start of each day is represented by the indicia 12 A.M. at the extreme left side of strip chart 71, while the indication of 11:30 A.M. is represented at the extreme right side of the chart. The time 12 noon is represented by indicia equidistant between the left and right edges of chart 71. Between 12 noon and the 12 A.M. and 11:30 P.M. are equally spaced indicia indicative of even-numbered hours during the day. Associated with each of the even-numbered indicia is an elongated line running parallel to the edges of sheet 71. Thereby, the time at which a set of average basis weight data was derived is easily ascertained by interpolation, if necessary, between the lines.

To summarize the operation of apparatus of the present invention, consider as an example the manner by which the record 74, FIG. 2, is formed. In normal operation integrator 24 derives a DC output voltage indicative of the average basis weight for each scan of detector 16 and source 17 across the width of sheet 11. In response to the integrator 24 output pen 34 is driven after each scan to inscribe sheet 71 with relatively short lines 75. Each of lines 75 is drawn on strip chart 71 by pen 34 in response to pen driver 33 being coupled to the output voltage of integrator 24 at the end of each scanning cycle, as detected by microswitch 22 and coupled to normally open contact 36 via pulse generator 38 and relay winding 37. As the output voltage of integrator 24 is applied to pen driver 33, chart 71 is being advanced by rotation of drive roller 41 in response to activation of motor 42 for a predetermined time interval. Motor 42 is driven for 10 seconds in response to contacts 44 being closed by energization of relay winding 45. In turn, relay winding 45 is energized by the pulse generated by source 38 and coupled to the winding through OR gate 46. In response to energization of winding 45, and therefore contacts 44, power is applied to the motor of driver 33 that translates pen 34, whereby the pen is translated to a position indicative of the integrated voltage fed through closed contacts 36. When the 10-second interval of the pulse generated by source 38 is completed, relays 37 and 45 are deenergized. Deenergization of relay 37 results in the output of integrator 24 being decoupled from controller 33 since contact 36 is open circuited, while deenergization of relay 45 removes power from motor 42 for takeup roll 41 and prevents power from being applied to the armature of pen 34. Thereby, pen 34 and strip chart 71 remain in situ until the next scan of detector 16 and source 17 across sheet 11 has been completed, as detected by microswitch 22.

After each of marks 75 has been inscribed on chart 71, it is necessary to reset integrator 24 to a zero level. Resetting of integrator 24 involves short circuiting capacitor 26 thereof, a function accomplished by detecting the trailing edge of the output of pulse generator 38 with differentiating and rectifying network 31, the output of which is fed to relay winding 29 that controls contacts 28. Relay winding 29 is also responsive to microswitch 21 to reset integrator 24 after each scan of detector 16 and source 17 from the edge of sheet 11 proximate microswitch 22 to the edge of the sheet proximate switch 21. Thereby, the output voltage of integrator 24 at the commencement of each scan of detector 16 and source 17 across sheet 11 is zero.

Integrator 24 activates driver 33 repeatedly for each scan of detector 16 and source 17 across the width of sheet 11 to derive the several traces indicated by lines 75 until it becomes time to standardize, as indicated by timer 52. When time for standardization is reached, timer 52 activates standardizing and motor control circuit 51 to draw detector 16 and switch 17 to an off-sheet position. If standardization should occur simultaneously with the completion of a scan of detector 16 and source 17 across sheet 11, the average basis weight value computed by integrator 24 will be recorded because relay windings 37 and 45 are cycled in a normal manner in response to the output of pulse generated source 38. After the average basis weight value has been inscribed on recorder 35, pen 34 and chart 71 remain at rest while the standardizing operation continues. Five seconds after the basis weight value was recorded, and while the standardizing operation is still in progress, pulse generator 53 is activated to energize relays 45 and 54, whereby the time and data indications are always time multiplexed to the input of driver 33 and pen 34. Energization of relays 45 and 54 results in closure of contacts 44 and 56, whereby the voltage at slider 57 is fed to driver 33 while applying power to the drive motor of pen 34 and motor 42.

Under the stated conditions, the potential at slider 57 is applied to motor pen driver 33 and pen 34 is deflected by an amount proportional to the voltage of the tap 59 on which slider 57 is alighting. In particular, if slider 57 engages the fourth tap from terminal 61, pen 34 is deflected as indicated by the trace segment 76, FIG. 2. After pen 34 has been deflected for a time interval of 10 seconds, the output voltage of pulse generator 53 returns to a zero level, whereby relay windings 45 and 54 are deenergized. Deenergization of windings 45 and 54 results in locking pen 34 and chart 71 in situ because power to the armature of motor 42 and the motor driving pen 34 is removed. Upon completion of the scan of detector 16 and source 17 immediately following standardization, pen 34 and chart 71 are activated to enable basis weight line segment 77 to be drawn.

In normal operation, the manner by which pen 34 draws additional average basis weight and timing marks on chart 71 should be apparent from the foregoing description. In the event, however, of system or gauge apparatus malfunction, pen 34 and chart 71 are translated so that during the entire time period of malfunction only time indications illustrated by trace segments 78, FIG. 2, are derived. The stair-step-like traces 78 120 derived in the event of malfunction because takeup roll 41 is driven in response to each output of ½-hour timer 52. The stair-step timing indications are more easily read from chart 71 than straight lines across the width of the paper, as would be derived if chart 71 were not advanced each time that the timing indication is derived.

Figure 3:
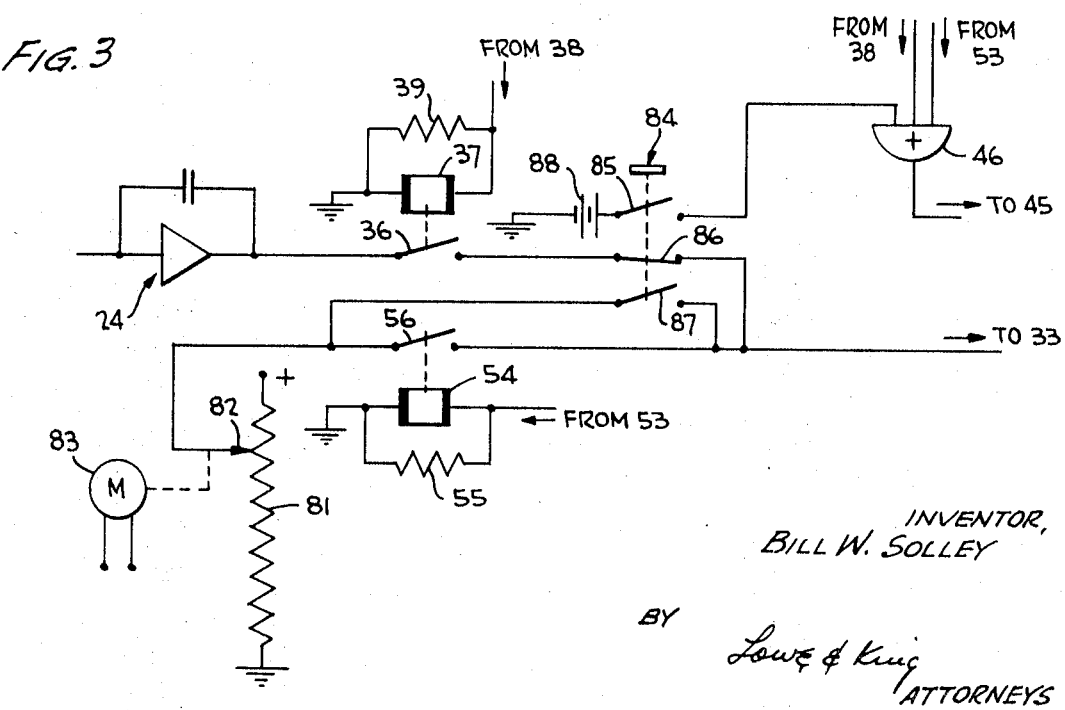
FIG. 3 is a modification of the recorder system of FIG. 1, wherein the recorder pen can be displaced either at will or periodically.

In many instances, it is a desideratum to provide time indications at the will of an operator, as well as periodically. In such an event, the network of FIG. 1 can be modified as illustrated by the schematic diagram of FIG. 3. In particular, in the circuit illustrated by FIG. 3, voltages for controlling the deflection of pen 34 are derived from a linear sawtooth generator comprising a circular potentiometer slide wire 81 responsive to the output shaft of synchronous clock motor 83. Thereby, the analogue signal voltage derived at slider 82 at any instant is proportional to the time of day, and is not a step function that changes in value only once every half hour.

To enable the continuous voltage derived at slider 82 to be fed either periodically or at will to pen driver 33, switch 84, having three ganged contact sets 85, 86 and 87, is provided. Normally open-circuited switch contacts 87 are connected in shunt with normally open contacts 56 connected between slider 82 and the input to pen driver 33. In contrast, normally closed switch contacts 86 are connected in series between normally open contacts 36 and the input of pen driver 33. Normally open contacts 85 are connected in series with DC supply 88 and an input to OR gate 46, the output of which controls energization of relay 45.

The operation of the system, therefore, in response to manual activation of switch 84, is to apply the time indicating voltage at slider 82 to the input of pen driver 33, while the armatures of the pen drive motor and motor 42 are enabled in response to energization of relay winding 45 through the positive voltage from source 88 being coupled via OR gate 46 to winding 45. Simultaneously, the output of integrator 24 is decoupled from the input of pen driver 33 since contacts 86 are open circuited. Thereby, if a scan of detector 16 and source 17 is about to be completed or has been completed, whereby relay winding 37 is energized, the integrator output is not combined with the time indicating signal derived from slider 82.

While I have described and illustrated several specific embodiments of my invention, it will be clear that variations in the details of the embodiments specifically illustrated and described may be made.

For example only, the recorder can be used with a variety of processes from which measurement data is obtained. Various types of measuring instruments can be utilized to supply the measurement data. The recorder can read out other relationships than the series of measured data averages, such as the actual measured data.

As an example, in a process where a property, such as thickness or weight per unit area of a material is measured, the property profile across the sheet can be recorded with time indications initiated at will or periodically, or the property in the direction of sheet movement can be recorded with the time indications.

Different types of recorders can be used, such as with driven chart and deflecting pen or with a pen that can be deflected in two mutually perpendicular directions by separate control signals with the chart stationary. As another alternative, the measured data and time information can be stored and later recorded in accordance with the present invention.

The circuits for implementing the invention can take several forms, including the use of analogue and digital techniques. For example, the recording arrangement described in U.S. Pat. No. 3,007,052, to Hickman et al. be used to obtain the average readout. The time record can be obtained when the recording of other data is interrupted for any reason, such as demand withdrawal, by appropriate circuit modifications. Digital circuits can be provided to implement the analogue

I claim:

1. A recorder for indicating the value of data derived from a measuring source and time comprising a means for marking a chart of the recorder, means for driving said marking means to a position determined by an input signal, means for deriving a signal varying as a function of time during a day, means for coupling a signal varying in response to the value of the measured data and said time-indicating signal as time multiplexed input signals to said driving means.

2. The recorder of claim 1 in combination with means for periodically standardizing said measuring source, means responsive to said standardizing means for decoupling said measuring source from said driving means, and means for coupling the time-indicating source to said driving means while said measuring means is decoupled from said driving means in response to said standardizing means being activated.

3. The recorder combination of claim 2 wherein said time-indicating signal is derived in steps and means for stepping said time-indicating signal in response to each periodic standardization of said measuring source.

4. The recorder of claim 1 further including means for at-will coupling the time-indicating signal to said driving means while decoupling the measured data indicating signal from said driving means.

5. The recorder of claim 1 including means for advancing the recorder chart as each time indicating signal is coupled to said driving means.

6. The recorder of claim 5 including means wherein said coupling means includes means for feeding the data indicating signal to said driving means only after a predetermined condition of the measured data being achieved, said means for advancing the recorder chart being activated as said data indicating signal is being coupled to said driving means.

7. The recorder of claim 6 further including means for advancing said chart and coupling said time and data indicating signals to said driving means for a sufficient time period to enable said scriber to be deflected by the total amount indicated by each of said signals.

8. A recorder for indicating the value of data derived from a measuring source and time comprising a scriber for marking a chart of the recorder, means for driving said scriber by an amount proportional to the amplitude of an analogue signal applied thereto, means for deriving an analogue signal varying in amplitude as a function of time during a day, means for coupling an analogue signal varying in amplitude in response to the value of the measured data and said time-indicating analogue signal as time multiplexed input signals to said driving means.

9. In a system for recording a process variable on a chart wherein a device measures said process variable and measurement is indicated on the recorder chart by the deflection of a marking means, and wherein the process measurement is interrupted by an event, the improvement comprising means responsive to the occurrence of said event to interrupt said measurement indication by said marking means and deflecting said marking means to a position on said chart indicative of the time of day.

10. The system as described in claim 9, wherein said event occurs periodically and on each occurrence said marking means is deflected to a position on said chart indicative of the time of day the event occurred.

11. A recorder for indicating the value of data derived from a measuring source and time comprising a scriber for marking a chart of the recorder, means for driving said scriber by an amount proportional to an input voltage applied thereto, means for deriving a potential varying in amplitude as a function of time during a day, means for coupling a potential varying in amplitude in response to the value of the measured data and said time-indicating potential as time multiplexed input signals to said driving means.